US011011906B2

(12) United States Patent
Pelegris et al.

(10) Patent No.: US 11,011,906 B2
(45) Date of Patent: May 18, 2021

(54) METHOD AND APPARATUS FOR ADAPTIVE AC/DC SURGE PROTECTION

(71) Applicant: Illinois Tool Works Inc., Glenview, IL (US)

(72) Inventors: Dimitris Jim Pelegris, Des Plaines, IL (US); Richard Joseph Urban, Prospect Heights, IL (US)

(73) Assignee: ILLINOIS TOOL WORKS, Glenview, IL (US)

( * ) Notice: Subject to any disclaimer, the term of this patent is extended or adjusted under 35 U.S.C. 154(b) by 226 days.

(21) Appl. No.: 16/164,685

(22) Filed: Oct. 18, 2018

(65) Prior Publication Data

US 2019/0123544 A1  Apr. 25, 2019

Related U.S. Application Data

(60) Provisional application No. 62/574,948, filed on Oct. 20, 2017.

(51) Int. Cl.
*H02H 3/22* (2006.01)
*H02H 11/00* (2006.01)
(Continued)

(52) U.S. Cl.
CPC ............ *H02H 3/22* (2013.01); *H02H 1/04* (2013.01); *H02H 3/207* (2013.01); *H02H 11/001* (2013.01); *H02H 11/002* (2013.01)

(58) Field of Classification Search
CPC ...... H02H 1/04; H02H 1/0061; H02H 1/0092; H02H 3/22; H02H 3/04; H02H 3/06; H02H 3/207; H02H 11/001; H02H 11/002
See application file for complete search history.

(56) References Cited

U.S. PATENT DOCUMENTS

2012/0154971 A1    6/2012  Brashear
2015/0109177 A1*   4/2015  Lavin .................. H01Q 9/22
                                                    343/770
(Continued)

FOREIGN PATENT DOCUMENTS

CN         2030387 U      1/1989

OTHER PUBLICATIONS

Ams Datasheet: AS3935 Franklin Lightning Sensor™ IC; [v1-04] Jan. 13, 2016 (43 pages).
(Continued)

*Primary Examiner* — Adolf D Berhane
(74) *Attorney, Agent, or Firm* — McAndrews, Held & Malloy, Ltd.

(57) ABSTRACT

Methods and apparatus for adaptive surge protection are disclosed. An example method comprises providing load voltage to the electric load by regulating a source voltage with a surge protection device; monitoring, via a voltage detection circuit, the source voltage from an electric source, and determining, via a wiring diagnostic circuit, whether a wiring fault is detected; monitoring, via a lightning detection circuit, for the presence of lightning within a threshold distance of the surge protection device; and breaking, with a switching device, a circuit connection to stop providing the load voltage to the electric load in response to detecting at least one of: a presence of the wiring fault, the presence of lightning within the threshold distance, an overvoltage at the source voltage; or an undervoltage at the electric source.

18 Claims, 9 Drawing Sheets

(51) Int. Cl.
H02H 3/20 (2006.01)
H02H 1/04 (2006.01)

(56) References Cited

U.S. PATENT DOCUMENTS

| | | |
|---|---|---|
| 2015/0260880 A1 | 9/2015 | Leoncavallo |
| 2016/0248263 A1* | 8/2016 | Hunt ........................ H02J 7/022 |
| 2018/0233897 A1* | 8/2018 | Pelegris ................ H02H 1/0092 |
| 2018/0248234 A1* | 8/2018 | Okabe ................. H01M 10/425 |

OTHER PUBLICATIONS

IEEE Power Engineering Society, IEEE Guide for the Protection of Communication Installations from Lightning Effects, IEEE Std. 1692-2011 (27 pages).

PCT, Notification of Transmittal of the International Search Report and the Written Opinion of the International Searching Authority, or the Declaration, in Application No. PCT/US2018/056682 dated Feb. 6, 2019 (18 pages).

* cited by examiner

METHOD AND APPARATUS FOR ADAPTIVE AC/DC SURGE PROTECTION

BACKGROUND

The present disclosure relates to providing electric power, and more particularly, to a method and apparatus for adaptive AC/DC surge protection.

Limitations and disadvantages of conventional approaches to AC/DC power surge protection will become apparent to one of skill in the art, through comparison of such approaches with some aspects of the present method and system set forth in the remainder of this disclosure with reference to the drawings.

SUMMARY

Methods and systems are provided for a method and apparatus for adaptive AC/DC surge protection, substantially as illustrated by and described in connection with at least one of the figures, as set forth more completely in the claims.

BRIEF DESCRIPTION OF THE DRAWINGS

These and/or other aspects will become apparent and more readily appreciated from the following description of the exemplary embodiments, taken in conjunction with the accompanying drawings.

The figures are not necessarily to scale. Where appropriate, similar or identical reference numbers are used to refer to similar or identical components.

DETAILED DESCRIPTION

Figure 1:
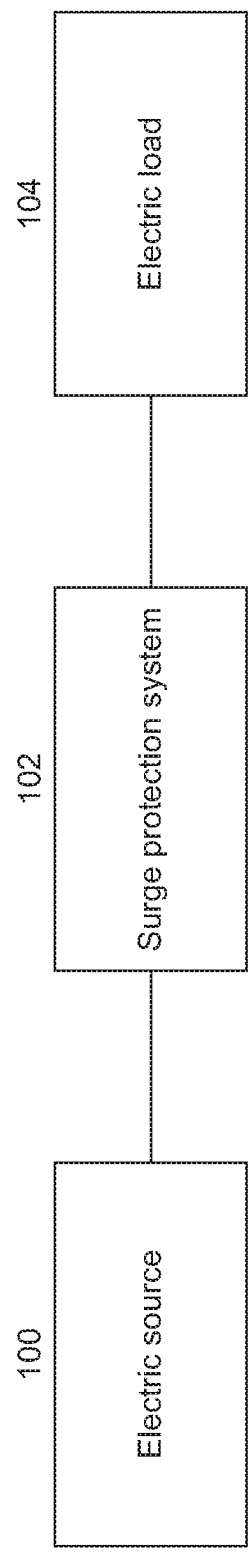
FIG. 1 shows a high level block diagram of a surge protection system in accordance with aspects of this disclosure.

Generally, a stable power supply is desirable for normal function of many types of equipment. A substantially higher voltage than a nominal operating voltage can cause damage to equipment, while a substantially lower voltage than a nominal operating voltage can cause equipment to malfunction.

An overvoltage condition at a site, also referred to as a surge or swell, can happen due to, for example, lightning, power company malfunction, and/or turning on or off many devices at the site. An undervoltage at a site, also referred to as sag, can happen due to, for example, too much demand for electricity by power company customers, power company malfunction, and/or turning on or off many devices at the site.

Disclosed examples provide surge protection from voltage fluctuations for one or more electric loads, as well as isolating when applicable the electric loads from power in case of detected wiring faults or other faults. In this disclosure, "overvoltage" is defined as the voltage above a high voltage threshold, and "undervoltage" is defined as the voltage under a low voltage threshold. Overvoltage and/or undervoltage conditions may be determined based on a nominal or expected voltage. While an overvoltage and/or an undervoltage can be set at different values for different purposes, an example of overvoltage for an AC system may be a voltage greater than 110% of the nominal RMS AC voltage, and an example of undervoltage for an AC system may be a voltage less than 90% of the nominal RMS AC voltage.

A wiring fault may be present when: a) a voltage between a neutral conductor and a ground conductor is above a high voltage threshold; b) at least one of a hot conductor, the neutral conductor, or the ground conductor are floating; c) the hot conductor and the neutral conductor are reversed with each other; d) a hot voltage is present on the neutral conductor; or e) the hot voltage is present on two or more of the hot conductor, the neutral conductor, or the ground conductor.

While a conductor in a floating condition may be technically different than that conductor being missing (not wired), for the purposes of this disclosure, the term "floating," as applied to a conductor, also refers to a missing conductor unless specifically stated otherwise.

During a lightning strike, it is possible that the earth (ground) near the area where lighting struck is saturated from the current flowing to ground produced by the lightning. Even with the best conventional surge protection devices, it is possible that electrical equipment connected to power lines may be damaged by lightning because, fundamentally, conventional surge protection devices are designed to discharge energy to ground. During a lightning strike, discharging energy to ground may become impossible as a result of ground potential rise. Therefore, preemptively disconnecting equipment from the power lines when lightning activity is detected has the advantage of improving protection of equipment during lightning strikes.

Disclosed methods for protecting an electric load include: providing load voltage to the electric load by regulating a source voltage with a surge protection device; monitoring, via a voltage detection circuit, the source voltage from an electric source, determining, via a wiring diagnostic circuit, whether a wiring fault is detected; monitoring, via a lightning detection circuit, for the presence of lightning within a threshold distance of the surge protection device; and breaking, with a switching device, a circuit connection to stop providing the load voltage to the electric load in response to detecting at least one of: a presence of the wiring fault, the presence of lightning within the threshold distance, an overvoltage at the source voltage; or an undervoltage at the electric source.

In some disclosed methods, the threshold distance is adjustable. In some disclosed methods, the threshold distance is within 5 kilometers.

In some disclosed methods, breaking the circuit connection includes breaking connections for all hot conductors and all neutral conductors between the electric source and the electric load.

Some disclosed methods include: monitoring, via the lightning detection circuit, for lightning activity within the threshold distance for a first time period; and in response to determining that lightning has not been detected within the threshold distance during the first time period, re-establishing the circuit connection to provide the load voltage to the electric load. In some disclosed methods, the first time period is adjustable.

Some disclosed methods include indicating to a user when lightning has been detected within the predetermined distance.

Some disclosed methods include collecting and storing lightning detection data.

Some disclosed methods further include transmitting, via at least one of a wired transmitter or a wireless transmitter, at least one of a status of the electric source, the electric load, the presence of lightning within the threshold distance, and a status of the surge protection device. In some disclosed methods, the status is transmitted to at least one of a monitoring station or the electric load.

Disclosed surge protection devices include: a voltage detection circuit configured to monitor a source voltage to be provided to an electric load by an electric source; a wiring diagnostics circuit configured to determine whether a wiring fault is detected; a lightning detection module configured to detect the presence of lightning within a threshold distance from the surge protection device; and a disconnect circuit configured to: selectively make a circuit connection between the electric source and the electric load; and break the circuit connection in response to detecting at least one of: detecting a wiring fault; the presence of lightning within the threshold distance; an overvoltage condition at the source voltage; or an undervoltage condition at the source voltage.

In some disclosed surge protection devices, the lightning detection module is configured to distinguish between lightning activity and non-lightning noise.

In some disclosed surge protection devices, the source voltage includes at least one of: DC voltage ranging from substantially 12 VDC to substantially 1500 VDC, or AC voltage ranging from substantially 100 VAC to substantially 600 VAC.

In some disclosed surge protection devices, the lightning detection module is powered by the surge protection device.

In some disclosed surge protection devices, the lightning detection circuit is configured to monitor for lightning activity within the threshold distance for a first time period, and the disconnect circuit is configured to, in response to a determination that lightning has not been detected within the threshold distance during the first time period, re-establish the circuit connection to provide the load voltage to the electric load. In some disclosed surge protection devices, at least one of the first time period or the threshold distance is adjustable.

Some disclosed surge protection devices include a communication device configured to transmit, via at least one of a wired and a wireless transmitter, at least one of a status of the electric load or a status of the surge protection device.

In some disclosed surge protection devices, the lightning detection module includes: an antenna; and a lighting detection circuit configured to: process signals received via the antenna; identify a lightning event within a threshold distance from the lightning detection module; and output an alert signal to the disconnect circuit in response to identifying the lightning event.

Some disclosed surge protection devices include an isolation circuit configured to isolate the lightning detection module from the disconnect circuit In some disclosed surge protection devices, the lighting detection module is powered via the surge protection device.

FIG. 1 shows a high level block diagram of a surge protection device in accordance with aspects of this disclosure. Referring to FIG. 1, there is shown an electric source 100, a surge protection system (SPS) 102, and an electric load 104. The electric source 100 may vary depending on the electric load 104 that is being protected by the SPS 102. For example, if the electric load 104 is a personal computer and related items (e.g., a monitor), the electric source 100 can be the home electric circuit, and, more particularly, an electric outlet that the SPS 102 is plugged in to. If the electric load 104 is a home, the electric source 100 may be the power company power line that connects the home to the power company's power grid. The electric load 104 may include commercial building(s), factory/factories, sections of a building, factory, or a home, etc. Accordingly, it can be seen that the SPS 102 as an embodiment of the disclosure can be scaled for a variety of electric loads.

The SPS 102 may range from a device that plugs in to a wall outlet, and into which other devices plug into, to larger devices that may be hardwired (or otherwise connected) to an electrical input point such as, for example, an electric fuse box. When sections of a house/building/factory/etc. are protected, the SPS 102 may be connected via one or more circuit breakers in the fuse box, or the equivalents of circuit breakers and fuse box.

Generally, the electric source 100 provides a source voltage to the SPS 102, and the SPS 102 provides load voltage to the electric load 104. When first put into service, prior to providing load voltage to the electric load 104, the SPS 102 may monitor whether the source voltage is within tolerance by being above a lower threshold and below an upper threshold. The lower threshold may be, for example, 10% below the nominal voltage, and the upper threshold may be, for example, 10% above the nominal voltage. The upper and lower thresholds may be different for different implementations, electric loads, and/or jurisdictions. However, because there is voltage suppression, the tolerance level for overvoltage can be higher depending on the specification for the suppression circuitry.

Additionally, as described previously, different embodiments may have different points of attachment to an electric circuit, but for ease of explanation, the SPS 102 will be described as a portable SPD that plugs into an electrical outlet, and into which one or more electric devices are plugged in. That is, the SPS 102 is in series with the electric devices. Accordingly, the "one or more electric devices" will be referred to as the electric load 104, and a 120 VAC home electric wiring will be referred to as the electric source 100. The electric load 104 may have two conductors (hot conductor and neutral conductor) or three conductors (hot conductor, neutral conductor, and ground conductor).

The SPS 102 can also monitor the electrical wiring for the electric source 100 to determine that there are no wiring (electrical) faults. In some cases, for example, when the load 104 is receiving load voltage, the electrical wiring for the electric load 104 may also be monitored when the electrical wiring for the electric source 100 is monitored. Some embodiments of the disclosure may have separate monitoring circuits to allow monitoring of the electrical wiring for the electric source 100 and the electric load 104 independently of each other when the electric load 104 is not being provided with a load voltage.

Once the SPS 102 determines that the source voltage is within tolerance, the load voltage will be provided to the electric load 104. Various embodiments may use one or more relays or switches to provide the load voltage to the electric load 104. If a wiring fault and/or out of tolerance source voltage is detected, the SPS 102 will not provide a load voltage to the electric load 104.

A wiring fault may comprise, for example, an impedance above a threshold impedance between a neutral conductor and a ground conductor. Another way to describe that wiring fault may be, for example, detecting a voltage above a threshold voltage between a neutral conductor and a ground conductor. A wiring fault may also be when any of a hot conductor, the neutral conductor, and the ground conductor is open (or missing). Or the hot conductor and the neutral conductor being reversed with each other. Or a hot voltage on the neutral conductor; hot voltage on two or more of the hot conductor, the neutral conductor, and the ground conductor.

A hot voltage can be defined as a voltage substantially close to a nominal voltage on a correctly wired hot conductor.

The SPS 102 may also output status messages if the SPS 102 is equipped to do so. The status may also include, for example, status of the electric source (voltage, wiring faults, lightning detection, etc.) and/or the electric load (voltage, wiring faults, etc.). Different embodiments of the disclosure may have different capabilities with respect to displaying messages and/or transmitting the status messages to different devices such as, for example, the electric load 104 or a monitoring station (not shown) that is not a part of the electric load 104. The monitoring station may be a device such as, for example, a smartphone, personal computer or laptop, tablet, etc. The monitoring station may also be a display for a user (owner of the home that has the SPS 102, for example) or monitoring personnel at a power station, for example. Accordingly, it can be seen that the status information may be sent to a range of different entities, where the status may be in an email, a text message, or other types of messages that can be understood by the receiving entity.

An example of a simple display configuration may comprise, for example, having a single LED (not shown) that turns on when the SPS 102 is providing power to the electric load 104 and turns off when the electric load 104 is not receiving power from the SPS 102. Or the LED can blink, or change colors when providing power versus when power is not provided to the electric load 104 due to some detected fault.

Figure 2:
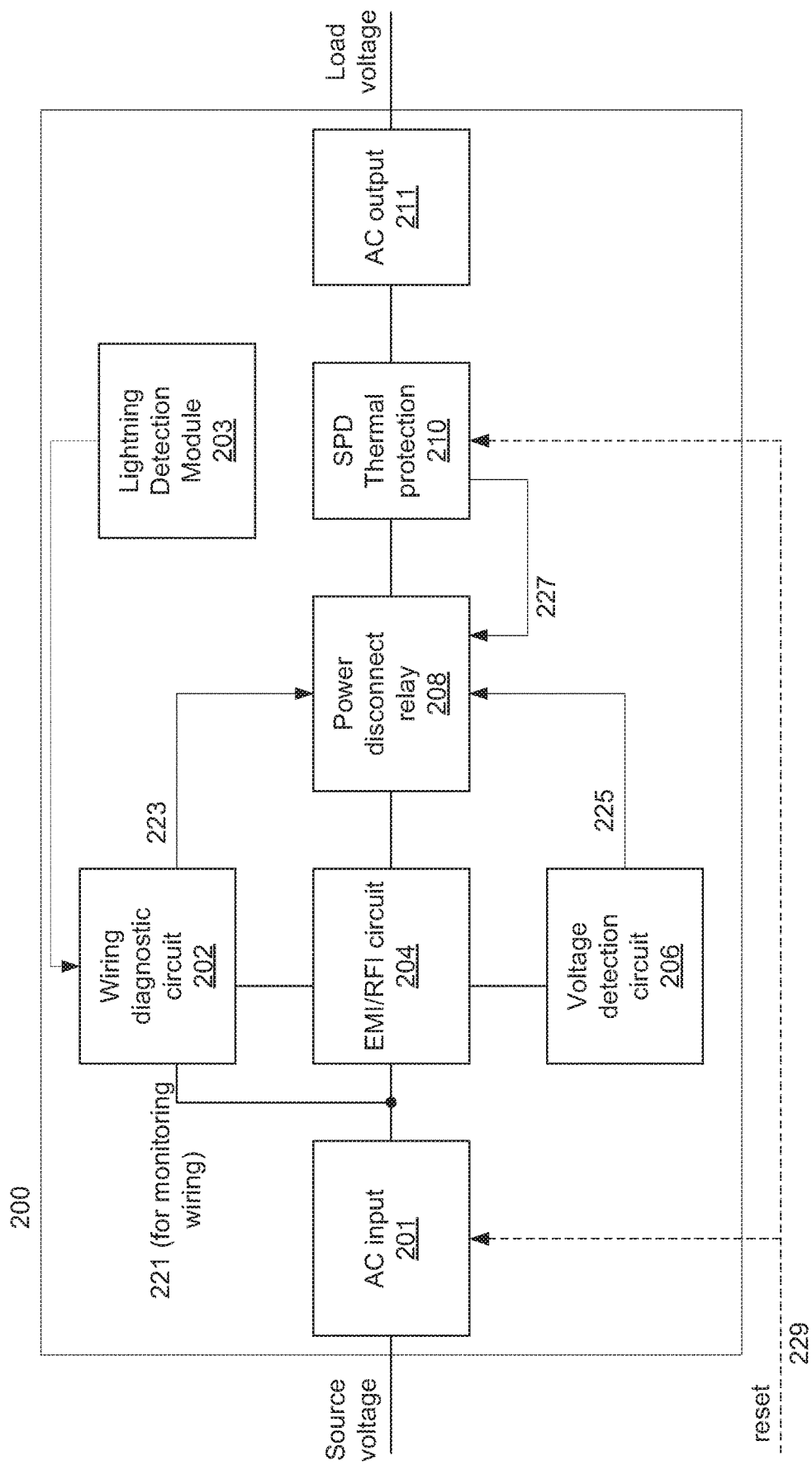
FIG. 2 shows a block diagram of an example surge protection device including a lightning detection module, in accordance with aspects of this disclosure.

FIG. 2 shows a block diagram of a surge protection device in accordance with an example embodiment of the disclosure. FIG. 2 shows a block diagram of the SPD 200, which may be similar to the SPS 102, but the SPD 200 refers more specifically to the voltage protection portion of the SPS 102. An example implementation shown in the SPD 200 comprises an AC input circuit 201, a wiring diagnostic circuit 202, an EMI/RFI circuit 204, a voltage detection circuit 206, a power disconnect relay 208, a surge/thermal protection circuit 210, and AC output circuit 211.

The AC input circuit 201 may be, for example, a power cable that connects the SPD 200 to the electric source 100. Some embodiments may also have a switch (not shown) that may be a part of the AC input circuit 201. The switch may allow the SPD 200 to be, for example, turned on or off.

The wiring diagnostic circuit 202 may monitor the electrical wiring of the electric source 100 and sometimes the electric load 104 to determine whether there are any wiring faults. When the load voltage is being provided to the electric load 104, the wiring of the electric source 100 and the electric load 104 appear to be a single circuit for the purposes of monitoring the electrical wiring. When the load voltage is not being provided to the electric load 104, then the wiring diagnostic circuit 202 only monitors the wiring of the electric source 100.

A wiring fault may be, for example, wires/conductors misconnected to have reverse polarity, open ground wire, open neutral conductor, open hot conductor, hot conductor and ground conductor reversed, hot conductor on neutral and hot conductor unwired, two hot conductors, no power present, etc. The wiring diagnostic circuit 202 may diagnose wiring for the electric source 100 (and sometimes the electric load 104) via the leads 221. The leads 221 may also be routed through the EMI/RFI circuit 204. During diagnosis after first being installed or turned on, the electric source 100 and the electric load 104 are isolated from each other since the power disconnect relay 208 does not make a circuit connection until after the wiring diagnosis. Accordingly, when the power disconnect relay 208 is not making a circuit connection, the wiring diagnosis is for the electric source 100. After the power disconnect relay makes a circuit connection, the wiring diagnosis is for the electric source 100 and the electric load 104.

If a wiring fault is detected, then the wiring diagnostic circuit 202 can signal the power disconnect relay 208 via the leads 223 by providing a wiring-not-OK signal. The power disconnect relay 208 will disconnect (or remain disconnected) so that load voltage is not provided to the electric load 104 until the wiring diagnostic circuit 202 provides a wiring-OK signal for the electric source 100 or for the electric load 104. The power disconnect relay 208 may disconnect all hot conductors and all neutral conductors, or just all hot conductors depending on the embodiment. No ground conductor is disconnected. The signals sent via the leads 223 may be digital signals or analog signals, and the wiring-not-OK signal may be sent as, for example, a default state.

If the signaling is via DC signals, then an example signaling system may have wiring-not-OK signal at one voltage level and wiring-OK signal at another voltage level. For example, a wiring-not-OK signal may be 0 VDC and wiring-OK signal may be +5 VDC. Accordingly, 0 VDC on a single conductor can be interpreted as the wiring-not-OK signal and +5 VDC on the same conductor can be interpreted as the wiring-OK signal. AC voltage may also be used for signaling two states by, for example, modulating a phase or amplitude of the AC voltage. Digital signals may also be transmitted using an AC carrier or using modulated DC voltage.

While the leads 223 were described as being used for signaling, the notification may also be via wireless transmission, or by using the power lines from the EMI/RFI circuit 204 to the power disconnect relay 208.

The EMI/RFI circuit 204 may provide filtering to the power provided to the electric load 104 to remove undesired signals from interfering with operation of the electric load 104, and also to prevent transmission of undesired signals generated by the electric load 104 from coupling on to the electric source 100.

The voltage detection circuit 206 may be used to detect and monitor the source voltage received by the SPD 200. If the source voltage is not within tolerance, then the voltage detection circuit 206 may provide a voltage-not-OK signal to the power disconnect relay 208 via the leads 225. The power disconnect relay 208 will then disconnect (or remain disconnected) so that the voltage is not provided to the electric load 104 until the voltage detection circuit 206 sends the voltage-OK signal that indicates that the source voltage is within tolerance of the nominal voltage, where the nominal voltage in this example is 120 VAC. The voltage detection circuit 206 may output voltage-not-OK signal as a default state. The signals sent via the leads 225 may be digital signals or analog signals.

If the signaling is via DC signals, then an example signaling system may have voltage-OK signal at one voltage level and voltage-not-OK signal at another voltage level. For example, a voltage-not-OK signal may be 0 VDC and voltage-OK signal may be +5 VDC. Accordingly, 0 VDC on a single conductor can be interpreted as the voltage-not-OK signal and +5 VDC on the same conductor can be interpreted as the voltage-OK signal. AC voltage may also be used for signaling two states by, for example, modulating a phase or amplitude of the AC voltage. Digital signals may also be transmitted using an AC carrier or using modulated DC voltage.

While the leads 225 were described as being used for signaling, the notification may also be via wireless transmission, or by using the power lines from the EMI/RFI circuit 204 to the power disconnect relay 208.

The power disconnect relay 208 may comprise a relay, a switch, a semiconductor device, or any other suitable device that may be able to make a connection to transmit power (voltage and current) to the electric load 104, or break the connection to stop transmission of power to the electric load 104. In various embodiments, the default state of the power disconnect relay 208 is to be disconnected. Accordingly, when the SPD 200 is first turned on, the power disconnect relay 208 does not transmit power until it receives both the wiring-OK signal from the wiring diagnostic circuit 202 and the voltage-OK signal from the voltage detection circuit 206. As an example, the voltage-OK signal and the wiring-OK signal may be logical-ANDed to allow the power disconnect relay 208 to make a connection when the load voltage is within tolerance and there are no wiring faults in both the electric source 100 and the electric load 104.

The surge/thermal protection circuit 210 may comprise appropriate circuitry to regulate the load voltage. For example, if the load voltage rises above an upper threshold, the surge/thermal protection circuit 210 may clamp voltage present at the input of the surge/thermal protection circuit 210 to output a maximum pre-determined voltage. As an example, if the nominal load voltage is 120 VAC and a maximum threshold desired is +10% (or 132 VAC), any voltage at the input higher than 132 VAC should be clamped to substantially 132 VAC. However, there may be cases where the surge/thermal protection circuit 210 may not be able to clamp the load voltage to the desired maximum load voltage. This may occur, for example, with surges due to lightning, or other high current faults. Accordingly, as the load voltage goes to overvoltage, the voltage detection circuit 206 may detect the overvoltage and send a signal to the power disconnect relay 208 to break the circuit connection to stop transmission of power to the electric load 104. Accordingly, the electric load 104 may be protected from damage due to the overvoltage.

The surge/thermal protection circuit 210 may also comprise a thermal protection device that can determine that the SPD 200 is becoming too hot. This may be due to too much current flowing thought the SPD 200 or one or more circuits of the SPD 200 overheating. In that case, the surge/thermal protection circuit 210 may send a temp-not-OK signal via the leads 227 to the power disconnect relay 208 to disconnect the power output to the electric load 104. When the surge/thermal protection circuit 210 detects that the SPD 200 has cooled down to an acceptable temperature, it may send a temp-OK signal to the power disconnect relay 208 to reconnect power output to the electric load 104. The signals sent via the leads 227 may be digital signals or analog signals. The temperature may be sensed by, for example, thermistors or other temperature sensing devices.

If the signaling is via DC signals, then an example signaling system may have temp-OK signal at one voltage level and temp-not-OK signal at another voltage level. For example, a temp-not-OK signal may be 0 VDC and temp-OK signal may be +5 VDC. Accordingly, 0 VDC on a single conductor can be interpreted as the temp-not-OK signal and +5 VDC on the same conductor can be interpreted as the temp-OK signal. AC voltage may also be used for signaling two states by, for example, modulating a phase or amplitude of the AC voltage. Digital signals may also be transmitted using an AC carrier or using modulated DC voltage.

While the leads 227 were described as being used for signaling, the notification may also be via wireless transmission.

The wireless transmission may be performed by appropriate circuitry for wireless transmission, and wireless reception if needed.

As described, various embodiments of the disclosure have the configuration where the surge/thermal protection circuit 210 comes after the power disconnect relay 208. One advantage of this configuration is that the components in the surge/thermal protection circuit 210 may be able to be rated to a lower voltage than if the surge/thermal protection circuit 210 is placed before the power disconnect relay 208.

The SPD 200 can also have a reset capability that is initiated via the leads 229. This may be, for example, by pressing a button (not shown) to turn the switch in the AC input circuit 201 to an ON position and the surge/thermal protection circuit 210 to allow the load voltage to be output to the electric load 104.

The AC output circuit 211 may be, for example, one or more sockets for receiving an electrical plug(s) of the electric load 104.

In operation, the AC input 201 may receive source voltage from the electric source 100. The AC input 201 can then provide the source voltage to the EMI/RFI circuit 204. The wiring diagnostic circuit 202 determines whether there is any fault in wiring for the electric source 100. If there is no wiring fault detected, a wiring-OK signal will be sent to the power disconnect relay 208. The voltage detection circuit 206 will also determine whether the source voltage (to the power disconnect relay 208) is within tolerance. If the voltage is within tolerance, then a voltage-OK signal will be sent to the power disconnect relay 208. The power disconnect relay 208 will then make a connection to provide power from the EMI/RFI circuit 204 to the surge/thermal protection circuit 210.

If a wiring-not-OK signal is received from the wiring diagnostic circuit 202 or if a voltage-not-OK signal is received from the voltage detection circuit 206, the power disconnect relay 208 will disconnect (or remain disconnected) so that it will not provide power from the EMI/RFI circuit 204 to the surge/thermal protection circuit 210.

The example wiring diagnostic circuit 202 receives signals from a lightning detection module 203. The lightning detection module 203 may monitor the nearby area for signs of lightning activity (e.g., lightning strikes) within one or more threshold distances while filtering out non-lightning noise. If the lightning detection module 203 detects lightning activity within a threshold distance, the lightning detection module 203 outputs an alert or other signal (e.g., to the wiring diagnostic circuit 202 or another circuit configured to trigger the power disconnect relay 208).

Example implementations of the lightning detection module 203 are described in U.S. patent application Ser. No. 14/412,992, by Ruggero Leoncavallo, filed Jun. 17, 2013, titled "Circuit Arrangement and Method for Disturber Detection." The entirety of U.S. patent application Ser. No. 14/412,992 is incorporated herein by reference. The lightning detection module 203 differentiates between lightning events and electromagnetic noise caused by man-made sources and/or other atmospheric conditions. The lightning detection module 203 may be powered by the SPD 200. The lightning detection module 203 may be surge protected by the SPD in a same, similar, or different manner as the surge protection of the electric load.

If the wiring diagnostic circuit 202 receives a lightning detection signal, the wiring diagnostic circuit outputs a "wiring-no-OK" signal to the power disconnect relay 208. In response to the "wiring-no-OK" signal, the power disconnect relay 208 disconnects the electric source from the electric load (or remain disconnected). If lightning is not detected, or is longer detected within the preprogrammed distance (e.g., after a threshold time), the lightning detection module 203 sends a wiring-OK signal to the power disconnect relay 208. The power disconnect relay 208 will then make (or continue) a connection to provide power from the electrical source to the electrical load.

In some examples, the lightning detection module 203 may send the lightning detection signal directly to the power disconnect relay 208 and/or to a multiplexer or other switching circuit, to control connection and/or disconnection between the electrical source and the electrical load by the power disconnect relay 208.

Figure 3:
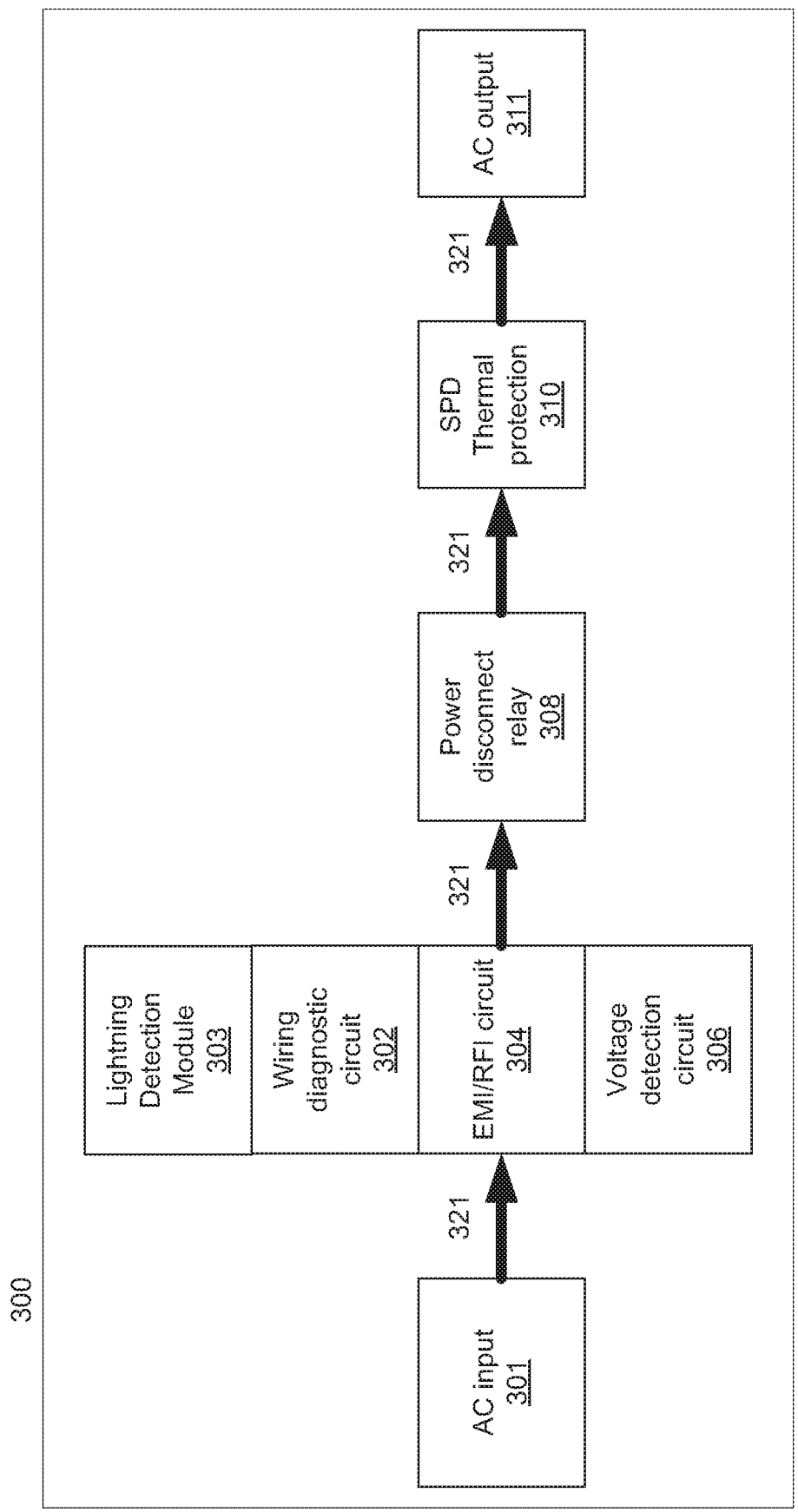
FIG. 3 shows a block diagram of a surge protection device in series with a load in accordance with aspects of this disclosure.

FIG. 3 shows a block diagram of an example surge protection device 300 in which the series with a load in accordance with an example embodiment of the disclosure. Referring to FIG. 3, there is shown the SPD 300 that is similar in function to the SPD 200 and has similar functional blocks. The SPD 300 has the AC input circuit 301, the wiring diagnostic circuit 302, the lightning detection module 303, the EMI/RFI circuit 304, the voltage detection circuit 306, the power disconnect relay 308, the surge/thermal protection circuit 310, and the AC output circuit 311, whose functions are similar to the corresponding blocks of the SPD 200.

The operation of the SPD 300 is similar to that described for the SPD 200. Accordingly, the current may flow in series from the AC input circuitry 301 to the EMI/RFI circuit 304, to the power disconnect relay 308, to the surge/thermal protection circuit 310, and to the AC output circuit 311. The lightning detection module 303 sends a lightning detection signal to the wiring diagnostic circuit. This type of implementation may be used where the amount of current is relatively limited such as, for example, for the portable SPDs that are plugged in to wall outlets. Specific embodiments may be able to accommodate different amounts of current and/or voltage. The EMI/RFI circuit 304 and the surge/thermal protection circuit 310 may be connected in parallel to the power lines 321 so they may not conduct most of the current that is being provided to the electric load 104.

Figure 4:
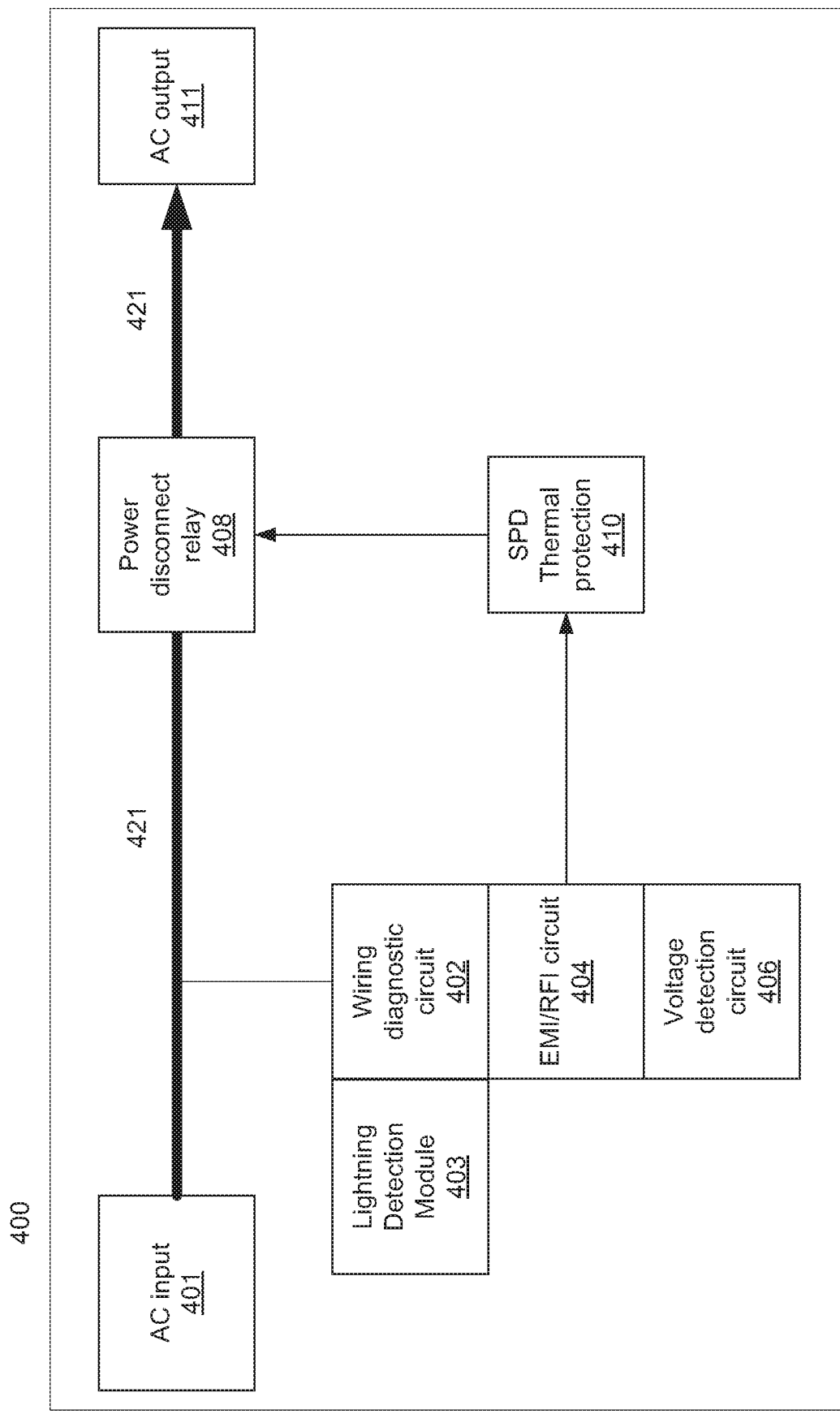
FIG. 4 shows a block diagram of a surge protection device in parallel with a load in accordance with aspects of this disclosure.

FIG. 4 shows a block diagram of a surge protection device in parallel with a load in accordance with an example embodiment of the disclosure. Referring to FIG. 4, there is shown the SPD 400 that is similar in function to the SPD 200 and has similar functional blocks. However, the SPD 400 is connected in parallel to the electric load 104, unlike the SPD 300 that is connected in series with the electric load 104. The SPD 400 has the AC input circuit 401, the wiring diagnostic circuit 402, the EMI/RFI circuit 404, the voltage detection circuit 406, the power disconnect relay 408, the surge/thermal protection circuit 410, and the AC output circuit 411. The AC input circuit 401, the wiring diagnostic circuit 402, the lightning detection module 403, the EMI/RFI circuit 404, the voltage detection circuit 406, the surge/thermal protection circuit 410, and the AC output circuit 411 are similar to corresponding devices described with respect to FIGS. 2 and 3.

The power disconnect relay 408 serves to connect or disconnect the surge/thermal protection circuit 410 to/from the power line 421 based on signals sent from the surge/thermal protection circuit 410. Accordingly, when the surge/thermal protection circuit 410 sends a temp-not-OK signal to the power disconnect relay 408, the power disconnect relay 408 disconnects the power line 421 from the surge/thermal protection circuit 410. When the surge/thermal protection circuit 410 sends a temp-OK signal to the power disconnect relay 408, the power disconnect relay 408 connects the power line 421 to the surge/thermal protection circuit 410.

Accordingly, it can be seen that the general operation of the SPD 400 is similar to the operation described for the SPD 200. However, the parallel architecture of the SPD 400 may be more suitable for high current situations. With the parallel architecture shown, the high current may only need to flow through the AC input circuit 401 and the AC output circuit 411. Therefore, high current components may not be needed for the wiring diagnostic circuit 402, the EMI/RFI circuit 404, the voltage detection circuit 406, the power disconnect relay 408, the surge/thermal protection circuit 410, thus reducing cost premium for high current devices in those circuits.

Figure 5:
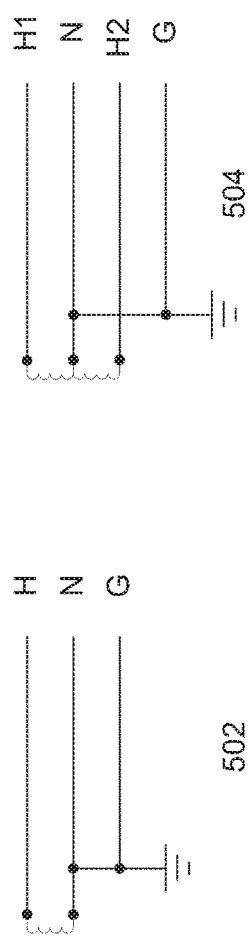
FIG. 5 shows various example electric current distribution circuits that can be protected by a surge protection device in accordance with aspects of this disclosure.
Figure 5:
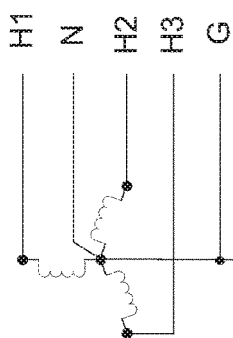
Figure 5:
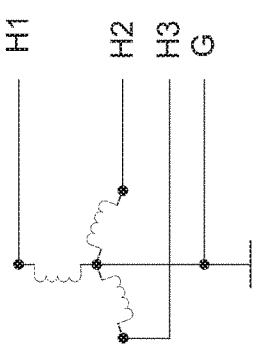
Figure 5:
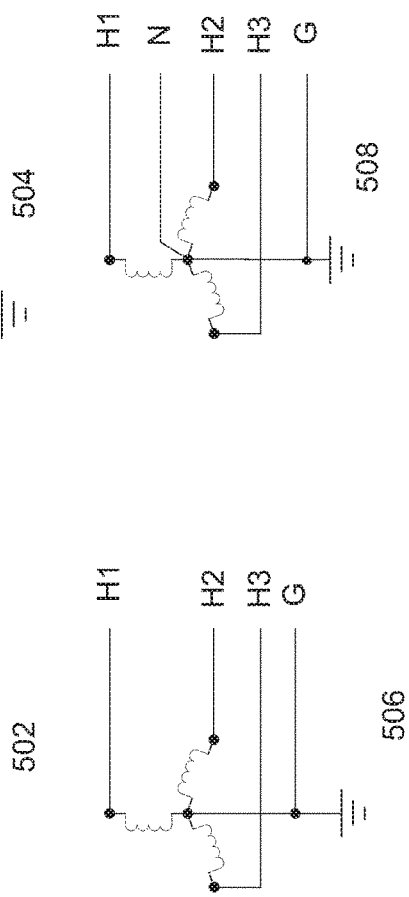
Figure 5:
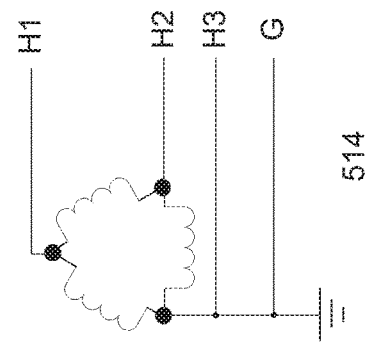
Figure 5:
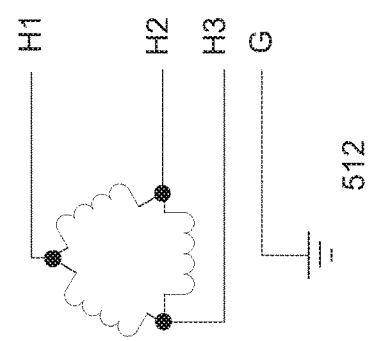
Figure 5:
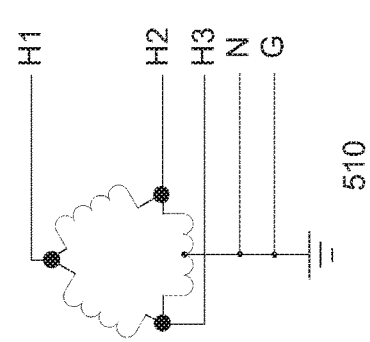

FIG. 5 shows various example electric current distribution circuits that can be protected by a surge protection device in accordance with an example embodiment of the disclosure. Referring to FIG. 5, there are shown various power circuit configurations that can be protected by various embodiments of the disclosure. The power configuration 502 shows a single phase power circuit with a hot line H, a neutral line N, and a ground line G. This configuration sees use for 110/120/220/240 VAC circuits, where the voltage is from the hot line H to the neutral line N. The power configuration 504 shows a single phase power circuit with two hot lines H1 and H2, a neutral line N, and a ground line G. This configuration sees use for 120 VAC to 240 VAC circuits. The 120 VAC is from one of the hot lines H1 or H2 to the neutral line N. The 240 VAC is from one hot line H1 to the other hot line H2.

The power configuration 506 is a 3-phase Y configuration with three hot lines H1, H2, and H3 and a ground line G. This configuration sees use for 480 VAC, where the voltage is from one of the hot lines to another of the hot lines. The power configuration 508 is a 3-phase Y configuration with three hot lines H1, H2, and H3, a neutral line N, and a ground line G. This configuration sees use for many different voltages including 120/208 VAC, 220/380 VAC, 230/400 VAC, 240/415 VAC, 277/480 VAC, and 347/600 VAC. The lower of each voltage pairs mentioned above (120/220/230/240/277/347 VAC) is from one of the hot lines to the neutral line N. The higher of each voltage pairs mentioned above (208/380/400/415/480/600 VAC) is the voltage across one of the hot lines to another of the hot lines.

The power configuration 510 is a 3-phase Delta configuration with three hot lines H1, H2, and H3, a neutral line N, and a ground line G. This configuration sees use for 120 VAC and 240 VAC, where the 120 VAC is from one of the hot lines to the neutral line N, and the 240 VAC is from one of the hot lines to another of the hot lines. The power configuration 512 is a 3-phase Delta configuration with three hot lines H1, H2, and H3, and a ground line G that is not connected to the input transformer. This configuration sees use for 240 VAC and 480 VAC, where the voltage is from one of the hot lines to another of the hot lines. The power configuration 514 is a 3-phase Delta configuration with three hot lines H1, H2, and H3, and a ground line G that is connected to the input transformer. This configuration sees use for 240 VAC and 480 VAC, where the voltage is from one of the hot lines to another of the hot lines.

While the various power configurations 502-514 are noted as being used for specific voltages, it should be noted that these are just examples.

Figure 6:
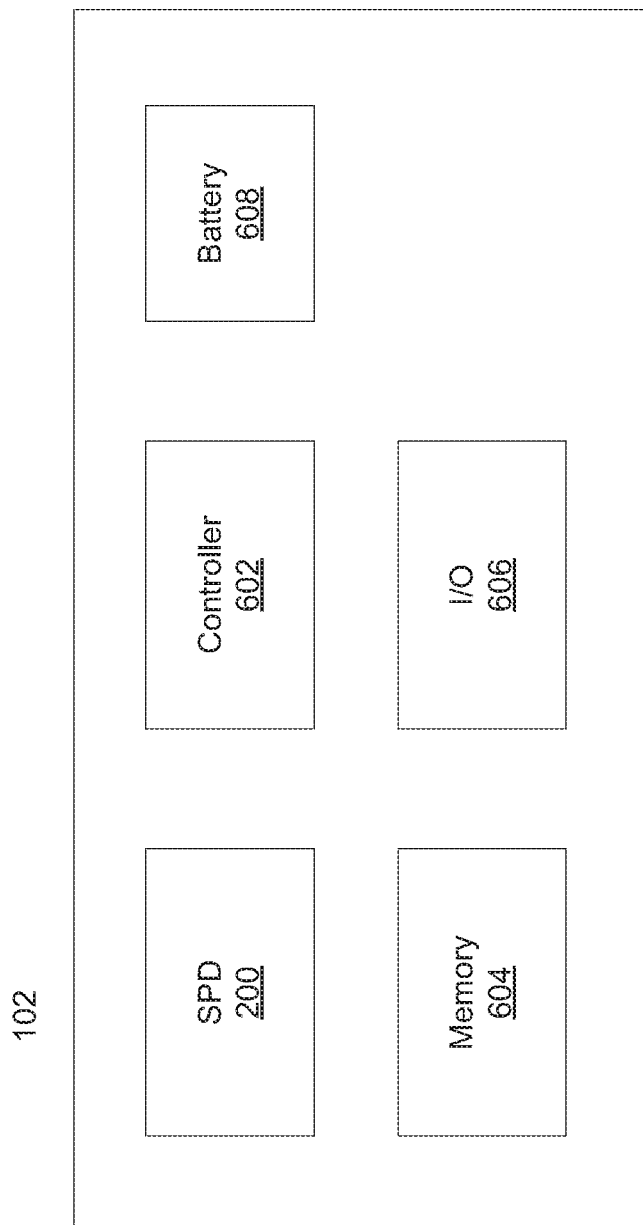
FIG. 6 shows a block diagram of a surge protection system in accordance with aspects of this disclosure.

FIG. 6 shows a block diagram of a surge protection system 102 (SPS) in accordance with an embodiment of the disclosure. Referring to FIG. 6, there is shown the SPS 102 that comprises the SPD 200, the controller block 602, the memory block 604, the I/O block 606, and a battery 608. The controller block 602 may comprise one or more processing units such as, for example, a microprocessor, a microcontroller, etc., and also support devices for operation of the processing units. The support devices may be glue logic and/or memory. The glue logic may comprise circuitry needed for interfacing the processing units to other devices. The memory may be used by the processing units to store executable instructions and/or data, and may comprise volatile and/or non-volatile memories.

In addition to, or in place of, the memory in the controller block 602, there may be a memory block 604 that comprises volatile and/or non-volatile memory. Accordingly, the memory block 604 may be used to store executable instructions as well as data.

The I/O block 606 may comprise various devices via which a user can enter information and/or commands. For example, there may be a power switch that turns on or turns off at least a portion of the SPS 102. There may also be a reset button that can be pressed to reset at least a portion of the SPS 102, such as, for example, the AC input circuit 201 and/or the surge/thermal protection circuit 210. Various embodiments may have individual reset buttons for each device to be reset. The I/O block 606 may also comprise other input devices such as, for example, a keyboard, buttons, switches, etc. The I/O block also may be used to program the lightning detection module. For example, the lightning detection distance that would signal an alert to the SPD may be programmed by the user.

The I/O block 606 may also have various output devices such as, for example, displays, speaker(s), light(s), vibratory output devices, etc. The I/O block 606 may also have communication interface where the SPS 102 can communicate with other devices either via wired communication or wireless communication. Accordingly, there may also be antenna(s) and/or sockets (e.g., USB socket(s), Firewire socket(s), Lightning socket(s), etc.) as part of the I/O block 606. As an example, an LED status light may indicate when lightning is detected within a preprogrammed distance by the lightning detection module.

The battery 608, which can be a rechargeable battery, may provide enough energy to allow the SPS 102 to function long enough to at least perform the source voltage monitoring, the wiring fault tests for the electric source 100 and the electric load 104, and report the status via the I/O block 606. Although not shown, a capacitor may also be used in place of or in addition to the battery 608 to provide electric energy for the functions described in this paragraph.

Figure 7:
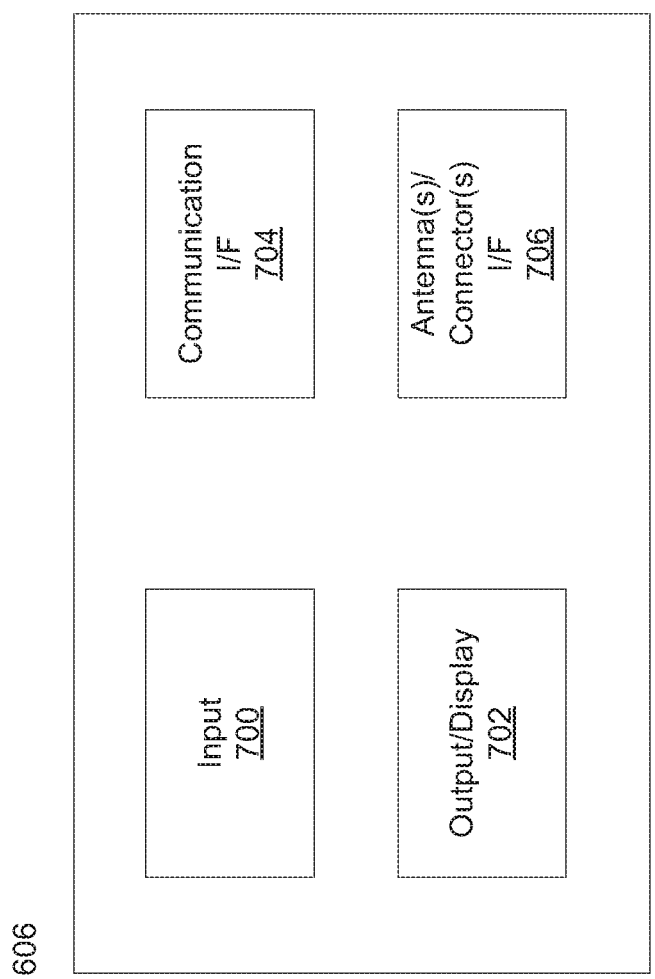
FIG. 7 shows a block diagram of input/output circuits of the surge protection system in accordance with aspects of this disclosure.

FIG. 7 shows a block diagram of input/output circuits of the surge protection system in accordance with an embodiment of the disclosure. Referring to FIG. 7, there is shown the I/O block 606 with input devices 700, output/display devices 702, communication interface 704, and antennas/connectors 706.

As described, the input devices 700 may comprise one or more of buttons, switches, keyboards, mouse, trackball, touchpad, touch screen, etc. that can be used to enter information or commands to the SPS 102. The output/display devices 702 may comprise one or more of a display screen for outputting text/graphic information, light(s) to provide information to a user, a speaker that can be used to output sound for a user, a vibratory device that can vibrate to alert a user, etc.

The communication interface 704 may comprise various circuitry that may allow communication via wired communication and/or wireless communication. Wired communication may take place, for example, using USB protocol or some other wireless protocol, and wireless communication may take place using, for example, a cellular protocol, Bluetooth protocol, near field communication protocol, etc.

The antenna/connector block 706 may comprise antennas that may be needed for wireless communication and/or sockets for plugging in various wired connectors for wired communication. Wired communication may also take place, for example, via the power lines to the electric source 100 to communicate to one or more devices that may be monitoring the operation/status of the SPS 102. Wired communication may also take place, for example, via the power lines to the electric load 104 to communicate to one or more devices that are a part of the electric load.

Figure 8:
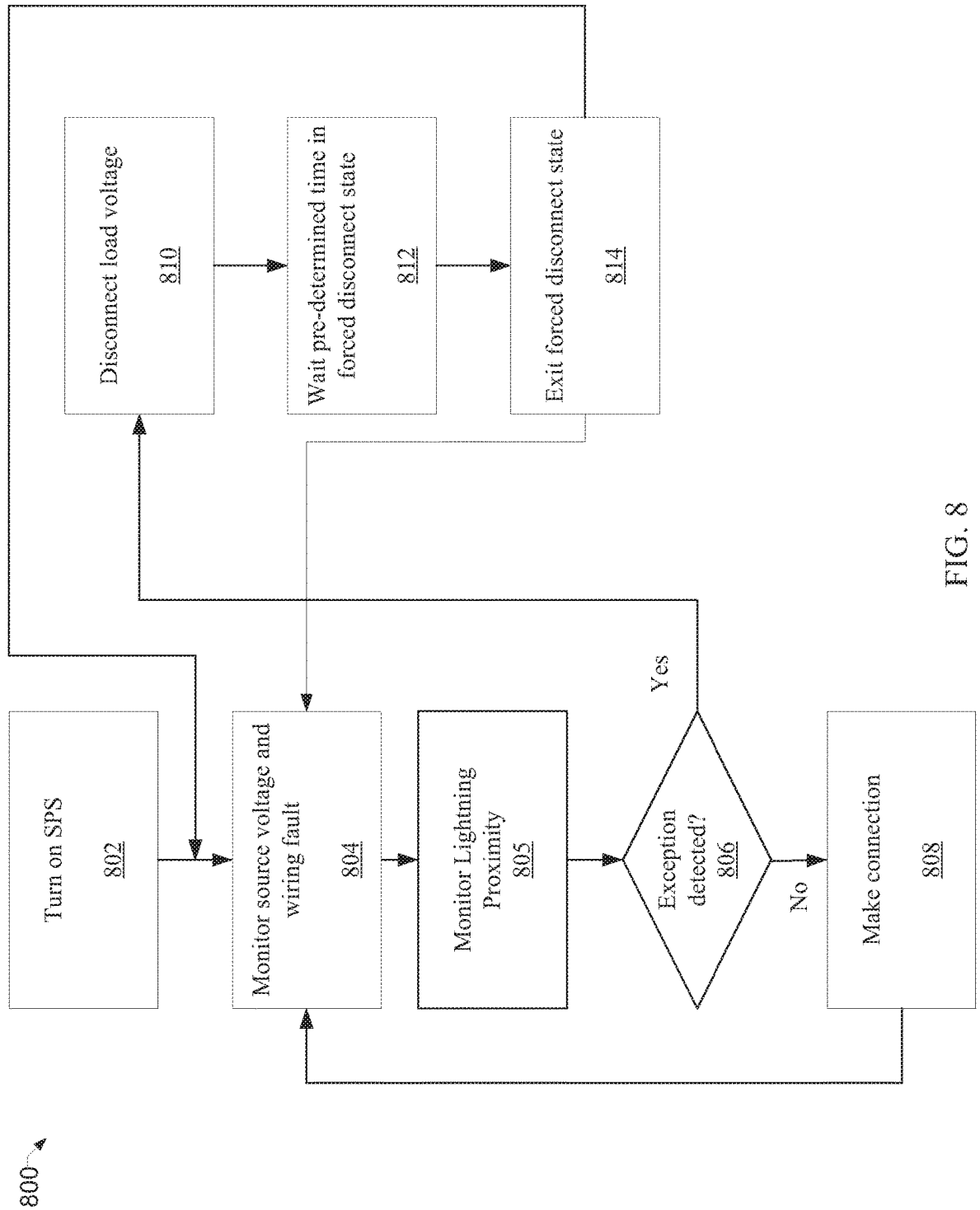
FIG. 8 shows a flow diagram of an example method of using a surge protection system in accordance with aspects of this disclosure.

FIG. 8 shows a flow diagram of an example method 800 of using a surge protection system in accordance with an embodiment of the disclosure. Referring to FIG. 8, there is shown an example flow diagram for operation of the SPS 102. At block 802, the SPS 102 is plugged in to a wall socket in, for example, a home and one or more electronic devices are plugged in to the SPS 102. The home wiring can be considered to be the electric source 100 that provides the source voltage to the SPS 102, and the electronic devices can be considered to be the electric load 104.

The SPS 102 is turned on if there is an on/off switch, and the switch is in the off position. The SPS 102 can then power on to a default disconnected state where the load voltage is not provided to the electric load 104. The SPS 102 may also be reset if a reset switch is present to put the SPS 102 to a known state. It should be noted that the reset switch may not need to be pressed.

At block 804, the SPD 200 checks to see if the source voltage is within tolerance, and also checks the circuitry for the electric source 100 and the circuitry for the electric load 104 to determine whether there are any wiring faults. At block 805 the SPD 200 checks to see if lightning has been detected by the lightning detection module 203 within a threshold distance (e.g., a predetermined, preprogrammed, and/or otherwise configured distance). At 806, if the source voltage is within tolerance, there are no wiring faults, and lightning has not been detected within a threshold distance, then the power disconnect relay 208 makes a connection at block 808 to provide the load voltage from the source voltage. The SPD 200 continues monitoring the source voltage, checking for wiring faults, and monitoring for lightning activity. While a wiring fault may generally be a static occurrence, sometimes a loose conductor or connection may form an open circuit due to heat, movement, and/or pressure. Similarly, a short circuit may form due to heat, movement, and/or pressure on a conductor or connection. Accordingly, it may be useful to have constant monitoring for wiring faults as well as monitoring the source voltage.

Returning to block 806, if there is a wiring fault, an out-of-tolerance source voltage, or lightning is detected within a threshold distance, the power disconnect relay 208 will break connection at block 810 and the electric load 104 will no longer receive power. At block 812, the power disconnect relay 208 may be set to a forced break connection state regardless of whether the voltage-OK and wiring-OK signals are present, and the SPS 102 will wait for a predetermined period of time. The signaling for the forced break connection and/or count the predetermined period may be performed by, for example, the controller 602, by the power disconnect relay 208, or by some other appropriate circuit in the SPS 102. If the signaling for the forced break connection is done by another circuit other than the power disconnect relay 208, the wiring-OK/wiring-not-OK and voltage-OK/voltage-not-OK signals may also go to the another circuit, which would send the forced break connection signal to the power disconnect relay 208. Accordingly, it can be seen that various different implementations can be used for controlling the power disconnect relay 208.

At block 814, after the predetermined period of time, the power disconnect relay 208 may exit the forced break connection state and respond to the monitoring of the source voltage and wiring at block 804. This process can continue until the SPS 102 is turned off. The predetermined period may be adjustable to different time periods.

Figure 9:
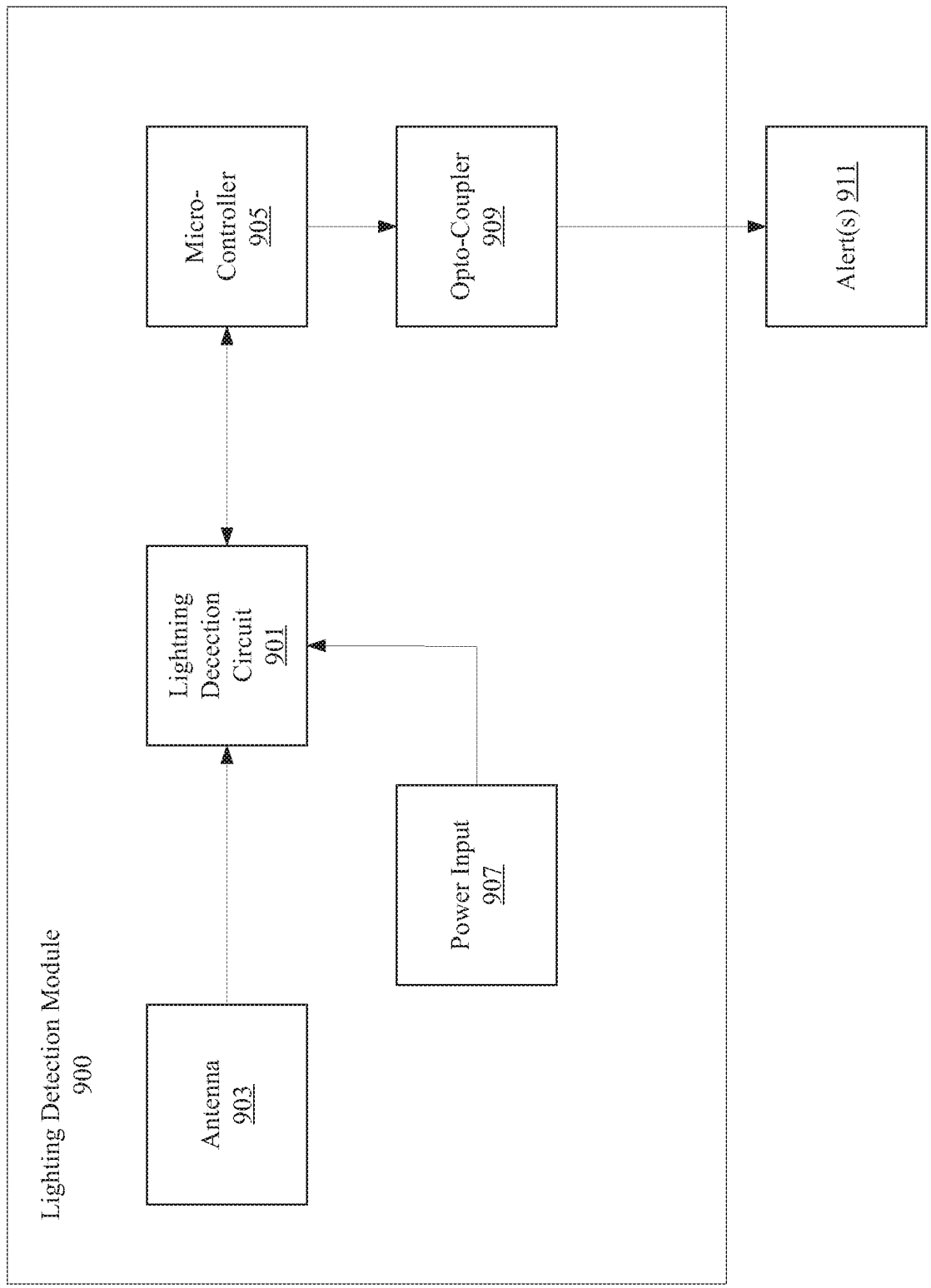
FIG. 9 shows a block diagram of an example implementation of the lightning detection module of FIG. 1.

FIG. 9 shows an example of a lightning detection module in accordance with an embodiment of the disclosure. The lightning detection module 900 may comprise a lightning detection circuit 901 that may be for example, one or more circuits as disclosed in the '992 application. The lightning detection circuit 901 may be connected to an antenna 903 and tuning circuit 903, which receives radiated signals in the atmosphere and sends them to the lightning detection circuit 901. The lightning detection circuit 901 may be connected to a micro-controller 905. The micro-controller 905 may be programmed to adjust the lightning distance which would trigger an alert for the SPD 200. The micro-controller 905 receives a lightning detection signal from the lightning detection circuit 901, and based on its programming may determine that an alert should be sent to the SPD 200. As an example, the micro-controller may be programmed to trigger an alert when lightning is detected within 5 kilometers of the SPD 200.

The lightning detection module 900 outputs lightning detection alert(s) 911 to the wiring diagnostic circuit 202 or the power disconnect relay 208 to cause the SPD 200 to disconnect the load equipment to provide protection from overvoltage caused by lightning. In one embodiment, the signal is sent from the micro-controller 905 to the SPD 200 via an opto-coupler 909. In another embodiment, the micro-controller 905 may be configured send the signal to the SPD 200 via a wired connection.

The lightning detection module may comprise a power input 907. The power input 907 may be for example, a 3-4 volt power input. The lightning detection module 900 may be powered by the SPD 200.

While a specific embodiment for operation of the SPS 102 was described, various other embodiments may follow different flow diagrams for protecting the electric load 104.

Various embodiments of the disclosure have been described, but it should be understood that other embodiments are also contemplated. For example, the wiring diagnostic circuit 202 has been described as signaling the power disconnect relay 208 via the leads 223. However, in other embodiments the signaling may also be communicated wirelessly. Similarly, the signaling by the voltage detection circuit 206 may be communicated wirelessly.

As presented in this disclosure, for ease of description, power may refer to voltage or current individually.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise one or more application specific integrated circuit or chips. Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A method for protecting an electric load, comprising:
providing load voltage to the electric load by regulating a source voltage with a surge protection device;
monitoring, via a voltage detection circuit, the source voltage from an electric source,
determining, via a wiring diagnostic circuit, whether a wiring fault is detected;
monitoring, via a lightning detection circuit, for the presence of lightning within a threshold distance of the surge protection device;
breaking, with a switching device, a circuit connection to stop providing the load voltage to the electric load in response to detecting at least one of:
a presence of the wiring fault,
the presence of lightning within the threshold distance,
an overvoltage at the source voltage; or
an undervoltage at the electric source; and
after breaking the circuit connection in response to detecting the presence of lighting within the threshold distance, monitoring, via the lightning detection circuit, for lightning activity within the threshold distance for a first time period; and
in response to determining that lightning has not been detected within the threshold distance during the first time period, re-establishing the circuit connection to provide the load voltage to the electric load.

2. The method of claim 1, wherein the threshold distance is adjustable.

3. The method of claim 1, wherein the threshold distance is within 5 kilometers.

4. The method of claim 1, wherein breaking the circuit connection comprises breaking connections for all hot conductors and all neutral conductors between the electric source and the electric load.

5. The method of claim 1, wherein the first time period is adjustable.

6. The method of claim 1, further comprising indicating to a user when lightning has been detected within the threshold distance.

7. The method of claim 1, further comprising collecting and storing lightning detection data.

8. The method of claim 1, further comprising transmitting, via at least one of a wired transmitter or a wireless transmitter, at least one of a status of the electric source, the electric load, the presence of lightning within the threshold distance, and a status of the surge protection device.

9. The method of claim 8, wherein the status is transmitted to at least one of a monitoring station or the electric load.

10. A surge protection device, comprising:
a voltage detection circuit configured to monitor a source voltage to be provided to an electric load by an electric source;
a wiring diagnostics circuit configured to determine whether a wiring fault is detected;
a lightning detection module configured to detect the presence of lightning within a threshold distance from the surge protection device; and
a disconnect circuit configured to:
selectively make a circuit connection between the electric source and the electric load; and
break the circuit connection in response to detecting at least one of:
detecting a wiring fault;
the presence of lightning within the threshold distance;
an overvoltage condition at the source voltage; or
an undervoltage condition at the source voltage;
wherein the lightning detection circuit is configured to monitor for lightning activity within the threshold distance for a first time period, and the disconnect circuit is configured to, in response to a determination that lightning has not been detected within the threshold distance during the first time period, re-establish the circuit connection to provide the load voltage to the electric load.

11. The surge protection device of claim 10, wherein the lightning detection module is configured to distinguish between lightning activity and non-lightning noise.

12. The surge protection device of claim 10, wherein the source voltage includes at least one of: DC voltage ranging from substantially 12 VDC to substantially 1500 VDC, or AC voltage ranging from substantially 100 VAC to substantially 600 VAC.

13. The surge protection device of claim 10, wherein the lightning detection module is powered by the surge protection device.

14. The surge protection device of claim 10, wherein at least one of the first time period or the threshold distance is adjustable.

15. The surge protection device of claim 14, further comprising a communication device configured to transmit, via at least one of a wired and a wireless transmitter, at least one of a status of the electric load or a status of the surge protection device.

16. A surge protection device, comprising:
a voltage detection circuit configured to monitor a source voltage to be provided to an electric load by an electric source;
a wiring diagnostics circuit configured to determine whether a wiring fault is detected;
a lightning detection module configured to detect the presence of lightning within a threshold distance from the surge protection device; and
a disconnect circuit configured to:
selectively make a circuit connection between the electric source and the electric load; and
break the circuit connection in response to detecting at least one of:
detecting a wiring fault;
the presence of lightning within the threshold distance;
an overvoltage condition at the source voltage; or
an undervoltage condition at the source voltage; and
wherein the lighting detection module comprises:
an antenna; and
a lighting detection circuit configured to:
process signals received via the antenna;
identify a lightning event within a threshold distance from the lightning detection module; and
output an alert signal to the disconnect circuit in response to identifying the lightning event.

17. The surge protection device of claim 16, further comprising an isolation circuit configured to isolate the lightning detection module from the disconnect circuit.

18. The surge protection device of claim 16, wherein the lightning detection module is powered via the surge protection device.

\* \* \* \* \*